United States Patent
Chang et al.

(10) Patent No.: US 7,492,684 B2
(45) Date of Patent: Feb. 17, 2009

(54) METHOD AND APPARATUS FOR CONTROLLING A TILT BETWEEN AN OPTICAL AXIS OF AN OPTICAL PICK-UP HEAD AND AN OPTICAL DISC

(75) Inventors: Ling-Chen Chang, Taipei (TW); Jia-Yu Liu, Taipei (TW); Han-Min Tan, Taipei (TW)

(73) Assignee: Lite-On It Corporation, Taipei (TW)

( * ) Notice: Subject to any disclaimer, the term of this patent is extended or adjusted under 35 U.S.C. 154(b) by 648 days.

(21) Appl. No.: 11/183,457

(22) Filed: Jul. 18, 2005

(65) Prior Publication Data
US 2006/0039259 A1 Feb. 23, 2006

(30) Foreign Application Priority Data
Aug. 18, 2004 (TW) .............................. 93124890 A (51) Int. Cl.
G11B 7/00 (2006.01)
(52) U.S. Cl. .................... 369/53.19; 369/44.32
(58) Field of Classification Search .......... None
See application file for complete search history.

(56) References Cited

U.S. PATENT DOCUMENTS

| 5,523,989 | A | * | 6/1996 | Ishibashi | 369/44.32 |
| 5,703,855 | A | * | 12/1997 | Kirino et al. | 369/53.19 |
| 5,825,740 | A | * | 10/1998 | Kahlman et al. | 369/97 |
| 6,137,754 | A | * | 10/2000 | Furukawa et al. | 369/44.32 |
| 6,246,648 | B1 | * | 6/2001 | Kuribayashi | 369/44.32 |

* cited by examiner

Primary Examiner—Joseph H Feild
Assistant Examiner—Christopher R Lamb
(74) Attorney, Agent, or Firm—Thomas, Kayden, Horstemeyer & Risley (57) ABSTRACT

A method and apparatus for controlling the tilt between the optical axis of an optical pick-up head and an optical disc applied in an optical disc drive is provided. A trapezoidal-wave signal in a radio frequency signal is received, wherein the trapezoidal-wave signal includes a rising edge and a falling edge. And a slope sum is calculated and so is an amplitude or a time domain area of the trapezoidal-wave signal. Then, a tangential tilt control parameter is generated according to the slope sum, and a radial tilt control parameter is generated according to the amplitude or the time domain area of the trapezoidal-wave signal. Thus, the optical disc drive is controlled according to the tangential tilt control parameter and the radial tilt control parameter for the optical axis of the optical pick-up head to be perpendicular to the optical disc.

11 Claims, 8 Drawing Sheets

FIG. 8

METHOD AND APPARATUS FOR CONTROLLING A TILT BETWEEN AN OPTICAL AXIS OF AN OPTICAL PICK-UP HEAD AND AN OPTICAL DISC This application claims the benefit of Taiwan application Serial No. 93124890, filed Aug. 18, 2004, the subject matter of which is incorporated herein by reference.

BACKGROUND OF THE INVENTION

1. Field of the Invention

The invention relates in general to a method and apparatus for controlling an optical disc drive, and more particularly to a method and apparatus for controlling a tilt between an optical axis of an optical pick-up head and an optical disc.

2. Description of the Related Art

Along with the rapid advance in the multi-media industry in recent years, small-sized and high-capacity optical storage media such as CD, DVD, which store the data in a better condition and for a longer duration, have been widely used in the storage of audio/video data, back-up data, etc. With the growing popularity of optical disc, optical disc drive with optical disc accessing function is playing a greater role in the market of multi-media products.

Figure 1:
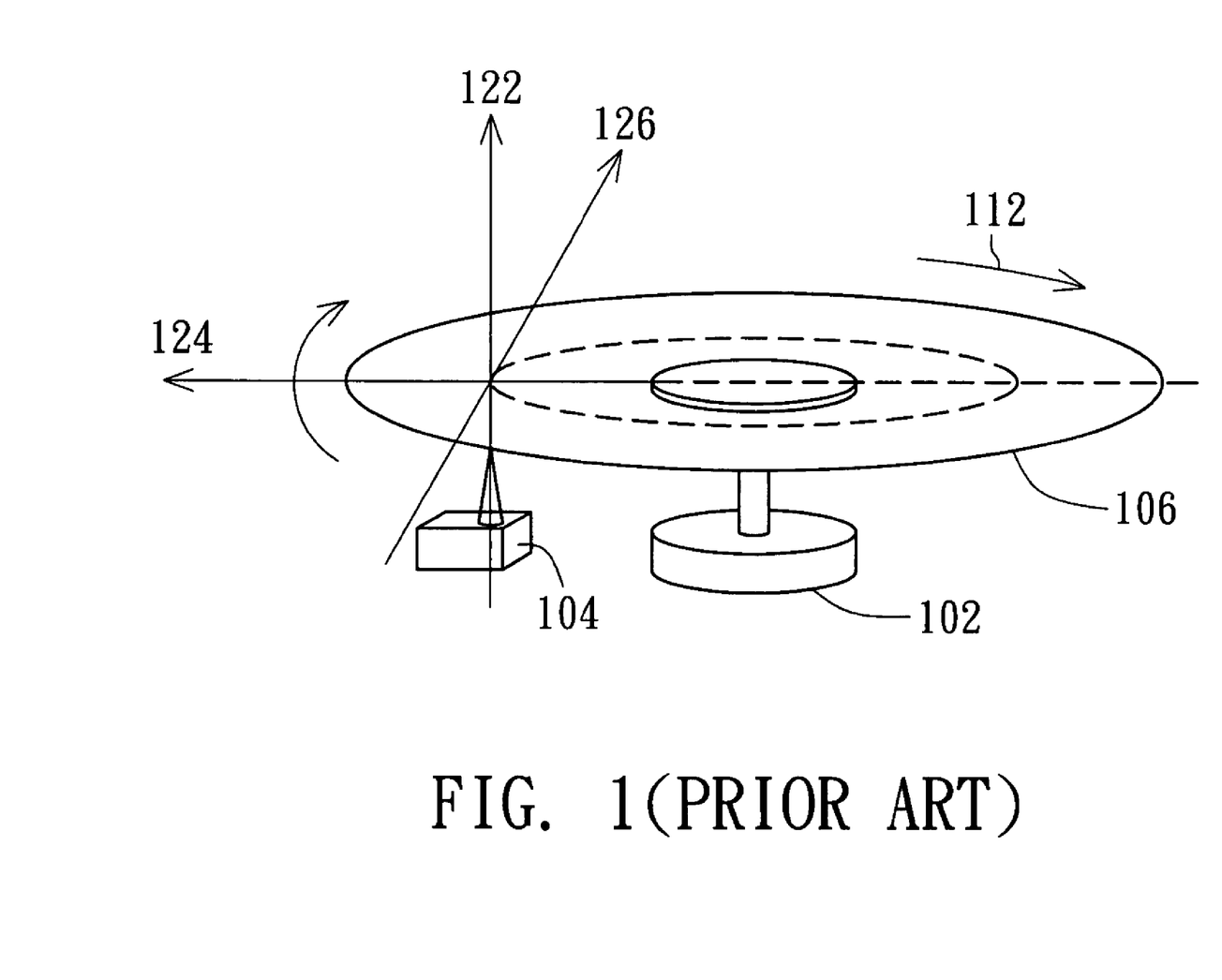
FIG. 1 is a diagram showing the relative position between the optical pick-up head of an optical disc drive and an optical disc.
Figure 2A:
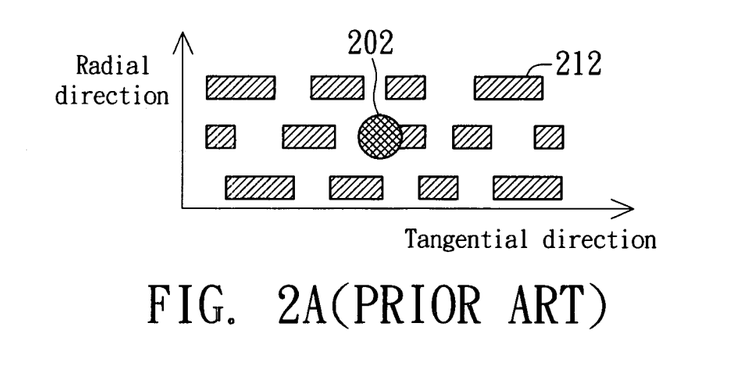
FIG. 2A is a schematic diagram of the laser spot when the optical pick-up head has no tilt deviation relative to the optical disc.

Referring to FIG. 1, optical disc drive rotates an optical disc 106 along a specific direction 112 via a spindle motor 102, moves an optical pick-up head 104 along the radial direction 124 of the optical disc 106, and uses a laser beam emitted by the optical pick-up head 104 to scan the record surface of the optical disc 106 for accessing data. Ideally, when the data of the optical disc 106 are being read, the optical axis 122 of the optical pick-up head 104 is perpendicular to the optical disc 106, and thus the optical pick-up head 104 can precisely read the data stored in the optical disc 106. Refer to FIG. 2A, meanwhile, the laser spot 202, which is projected onto the record surface of the optical disc 106 for reading the recorded data 212, would have an even and centralized energy distribution.

However, in practical implementation, the optical disc 106 would deviate during the rotation, therefore preventing the optical axis 122 of the optical pick-up head 104 from maintaining perpendicular to the optical disc 106. Consequently, the laser beam projected onto the optical disc 106 would cause aberrations of the light spot such as spherical aberration, coma, astigmatism, field curvature, distortion, etc. The optical aberrations would deteriorate quality of optical paths and undermine the quality of electric signals, resulting in increase of data accessing errors.

Figure 2B:
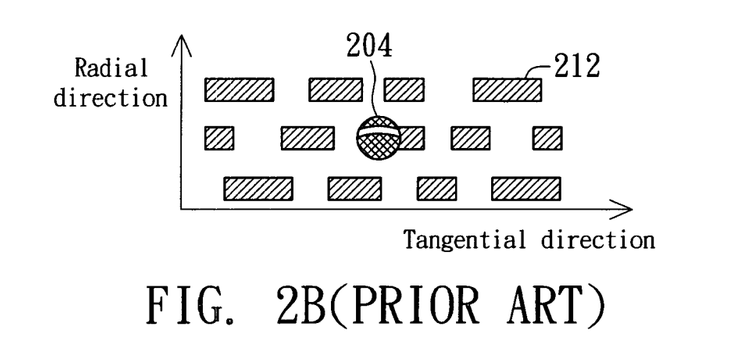
FIG. 2B is a schematic diagram of the laser spot when the optical pick-up head has radial-direction tilt deviation relative to the optical disc.
Figure 2C:
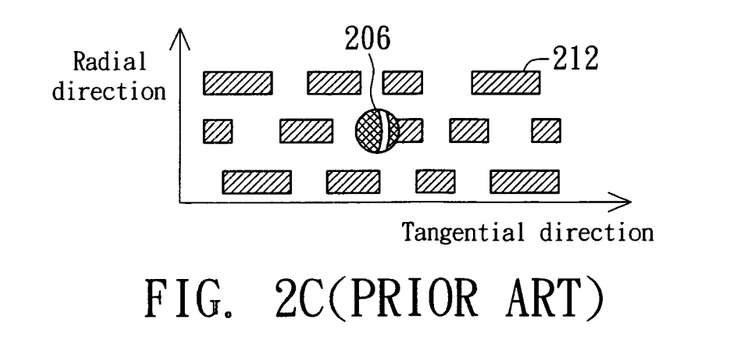
FIG. 2C is a schematic diagram of the laser spot when the optical pick-up head has tangential-direction tilt deviation relative to the optical disc.

The tilt between the optical axis 122 of the optical pick-up head 104 and the optical disc 106 can mainly be decomposed into tilts in two directions for the convenience of analysis and calibration: one is the tilt along the radial direction 124, and the other is the tilt along the tangential direction 126. Referring to FIG. 2B, the deviation in the tilt along the radial direction 124 would mainly cause the laser spot 204 projected onto the record surface of the optical disc 106 to have uneven energy distribution along the radial direction 124. Referring to FIG. 2C, the deviation in the tangential direction 126 would mainly cause the laser spot 206 projected onto the record surface of the optical disc 106 to have uneven energy distribution along the tangential direction 126.

Therefore, how to achieve a method for controlling the tilt between the optical axis of the optical pick-up head and the optical disc for the optical axis of the optical pick-up head to maintain at an optimal tilt in response to the optical disc has come to the fore.

SUMMARY OF THE INVENTION

According to the object of the invention, a method and apparatus for controlling a tilt between an optical axis of an optical pick-up head and an optical disc is provided to improve the quality of data reading.

It is therefore an object of the invention to provide a method for controlling a tilt between an optical axis of an optical pick-up head and an optical disc, applied in an optical disc drive. First a trapezoidal-wave signal in a radio frequency signal is received, wherein the trapezoidal-wave signal comprises a rising edge and a falling edge. And a slope sum is calculated, wherein the slope sum is a sum of the slope of the rising edge and the slope of the falling edge. Thus a tangential tilt control parameter is generated according to the slope sum. The optical disc drive is controlled according to the tangential tilt control parameter.

In an embodiment, the tangential tilt control parameter is generated by inquiring a tangential tilt characteristic function. The tangential tilt characteristic function is generated by first determining a plurality of target values of the tangential tilt control parameters corresponding to a plurality of tangential-direction tilts. And respectively control the optical disc drive according to the target values of the tangential tilt controlling parameters, and receive a plurality of corresponding trapezoidal-wave signals outputted by the optical pick-up head, wherein each trapezoidal-wave signal results from one of the target values and comprises a rising edge and a falling edge. Then a plurality of slope sums is calculated, wherein each of the slope sum is the sum of a slope of the rising edge and a slope of the falling edge of the corresponding trapezoidal-wave signal. Thus the tangential tilt characteristic function according to the target values of the tangential tilt control parameters and the corresponding slope sums can be generated.

In an embodiment, in the method it further calculates an amplitude or a time domain area of the trapezoidal-wave signal. A radial tilt control parameter is generated according to the amplitude or time domain area of the trapezoidal-wave signal, and the optical disc drive can be controlled according to the radial tilt control parameter.

In an embodiment, the radial tilt control parameter is generated by inquiring a radial tilt characteristic function. The radial tilt characteristic function is generated by first determining a plurality of target values of radial tilt control parameters corresponding to a plurality of radial-direction tilts. And respectively control the optical disc drive according to the target values of the radial tilt control parameters, and receive a plurality of corresponding trapezoidal-wave signals outputted by the optical pick-up head. Then an amplitude or a time domain area of each trapezoidal-wave signal result is calculated, and the radial tilt characteristic function according to the target values of the radial tilt control parameters and the amplitudes or the time domain areas of the corresponding trapezoidal-wave signals can be generated.

It is therefore another object of the invention to provide an apparatus for controlling a tilt between an optical axis of an optical pick-up head and an optical disc, applied in an optical disc drive. The apparatus comprises a signal receiving unit, a calculating unit and a parameter generating unit. The signal receiving unit is for receiving a trapezoidal-wave signal in a radio frequency signal comprising a rising edge and a falling edge. The calculating unit is for calculating a slope sum, wherein the slope sum is the sum of the slope of the rising and the slope of the falling edge. The parameter generating unit generates a tangential tilt control parameter according to slope sum, wherein the tangential tilt control parameter is for controlling the tilt.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 3:
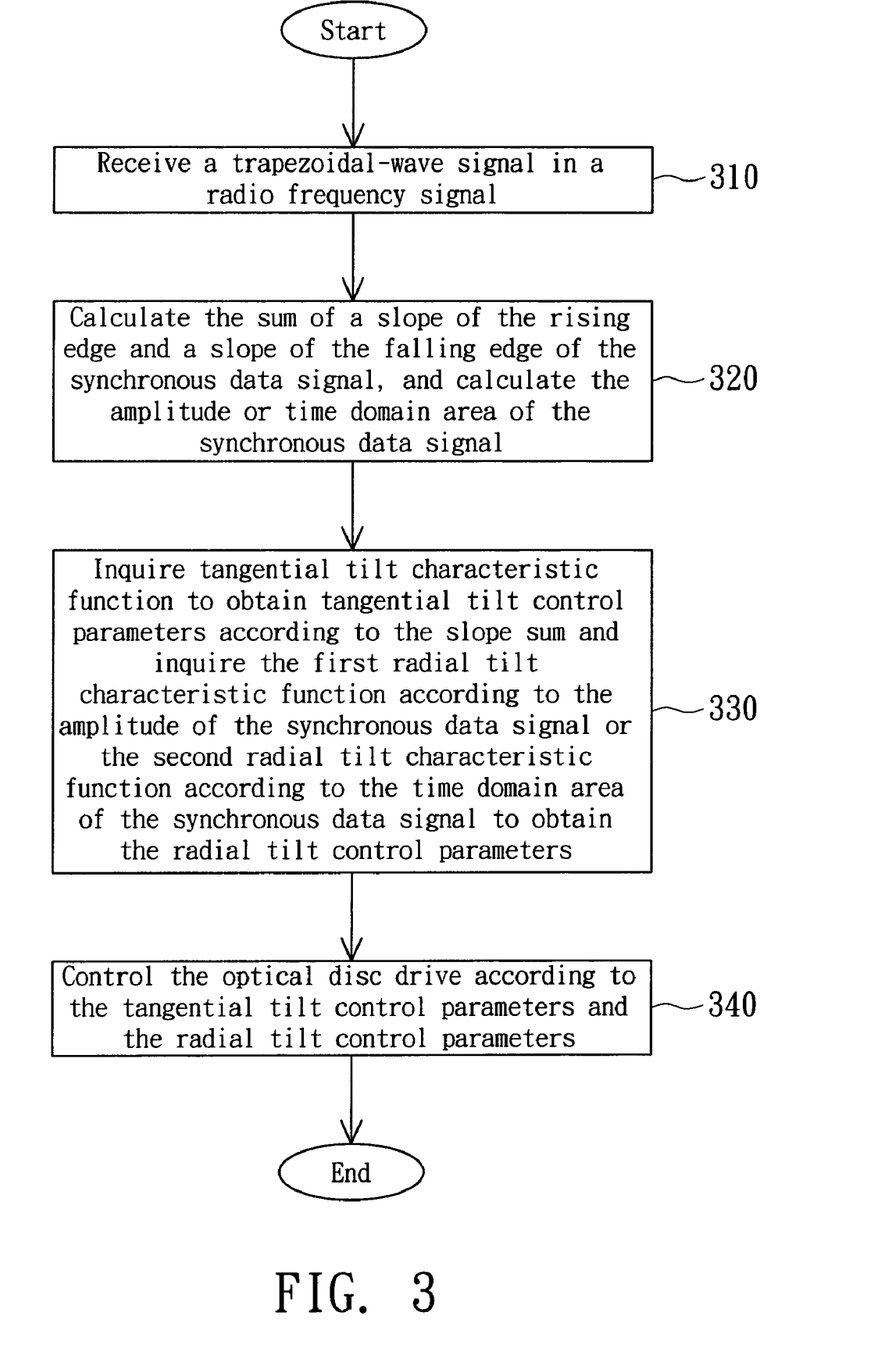
FIG. 3 is a flowchart of a method for controlling the tilt between the optical axis of the optical pick-up head and the optical disc according to a preferred embodiment of the invention.

Referring to FIG. 3, a flowchart of a method for controlling the tilt between the optical axis of the optical pick-up head and the optical disc according to a preferred embodiment of the invention is shown. The method is applied in an optical disc drive. At first, receive a trapezoidal-wave signal having N time units in the optical disc radio frequency signal. The trapezoidal-wave signal includes a rising edge and a falling edge. According to the present preferred embodiment, a synchronous data signal of a constant signal length complying with DVD specification or CD specification can be used as a trapezoidal-wave signal required for detecting the tilt between the optical axis of the optical pick-up head and the optical disc as shown in step 310. The synchronous data signal complying with DVD specification includes a trapezoidal-wave signal having 14 time units and having a rising edge and a falling edge.

Next, in step 320, calculate the sum of the slope of the rising edge and the falling edge of the synchronous data signal, as well as the amplitude or time domain area of the synchronous data signal. The time domain area of the synchronous data signal is obtained by, for example, integrating the function of the synchronous data signal over the time domain. As shown in FIG. 2C, the tilt deviation in tangential direction 126 mainly causes the laser spot 206 projected onto the record surface of the optical disc 106 to have uneven distribution along the tangential direction 126, thereby causing the radio frequency signal to have different time domain responses when passing through the rising edge and the falling edge. The tilt relevant information in tangential direction 126 such as the angle of the tangential-direction tilt can be obtained through the comparison between the slope of the rising edge and the slope of the falling edge of the trapezoidal-wave signal. In the present preferred embodiment, the comparison between the slope of the rising and the slope of the falling edge of the trapezoidal-wave signal is implemented according to the summation of the slopes (hereinafter as "slope sum"). Referring to FIG. 2B and FIG. 2C again, the deviation of the tilt in any direction would cause uneven energy distribution of the laser spot, causing the amplitude or time domain area of the radio frequency signal of the trapezoidal-wave signal to change.

Then, in step 330, inquire a tangential tilt characteristic function or a tangential tilt characteristic table transformed from the tangential tilt characteristic function to obtain the expected tangential tilt control parameter according to the slope sum. Meanwhile, inquire a first radial tilt characteristic function according to the amplitude of the synchronous data signal or a first radial tilt characteristic table transformed from the first radial tilt characteristic function to obtain an expected radial tilt control parameter. Alternatively, the expected radial tilt control parameter can also be obtained by inquiring a second radial tilt characteristic function or a second radial tilt characteristic table transformed from the second radial tilt characteristic function according to the time domain area of the synchronous data signal.

The tangential tilt characteristic function, the tangential tilt characteristic table, the first radial tilt characteristic function, the first radial tilt characteristic table, the second radial tilt characteristic function, and the second radial tilt characteristic table are pre-set before the products leave the factory or designed to be obtained by the user when executing calibration after the products leave the factory. The tangential tilt characteristic function and the tangential tilt characteristic table are for the corresponding relationship between the slope sum and the tangential tilt control parameter. The first radial tilt characteristic function and the first radial tilt characteristic table are for the corresponding relationship between the synchronous data signal the amplitude of the radial tilt control parameter. The second radial tilt characteristic function and the second radial tilt characteristic table are for the corresponding relationship between the time domain area of the synchronous data signal and the radial tilt control parameter. The method for generating the tangential characteristic function, the tangential tilt characteristic table, the first radial tilt characteristic function, the first radial tilt characteristic table, the second radial tilt characteristic function, or the second radial tilt characteristic table would be discussed later.

At last, in step 340, control the optical disc drive according to the obtained tangential tilt control parameter and the radial tilt control parameter. For example, by controlling the optical pick-up head 104 or other actuators relevant to the adjustment of the tilt, the optical axis of the optical pick-up head 122 remains at a preferable tilt to the optical disc 106, i.e., the optical axis of the optical pick-up head remains perpendicular to the optical disc.

The method shown in FIG. 3 can be performed recursively to obtain a preferable tangential tilt control parameter and a radial tilt control parameter. Alternatively, step 330 and step 340 can be processed to determine only the tangential tilt control parameter or the radial tilt control parameter during one recursion, and determine the radial tilt control parameter or the tangential tilt control parameter in the next recursion, respectively.

Figure 4A:
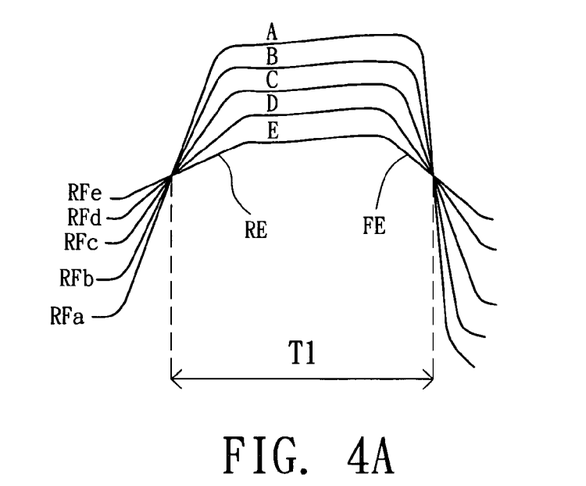
FIG. 4A is a diagram showing the corresponding radio frequency signals when the optical disc declines at different angles along the tangential direction.

The method for generating the tangential tilt characteristic function is disclosed below. Referring to FIG. 4A, a diagram showing the radio frequency signals corresponding to different optical disc tilts along the tangential direction is shown. Synchronous data signals A, B, C, D and E each having a nominal time width T1 within radio frequency signals RFa, RFb, RFc, RFd and RFe respectively correspond to the state of the optical disc having a tilt 0°, 0.2°, 0.4°, 0.6° and 0.8° along the tangential direction. Each of the synchronous data signals A~E comprises a rising edge RE and a falling edge FE. The slope of each rising edge RE and the slope of each falling edge FE are with opposite signs.

Figure 4B:
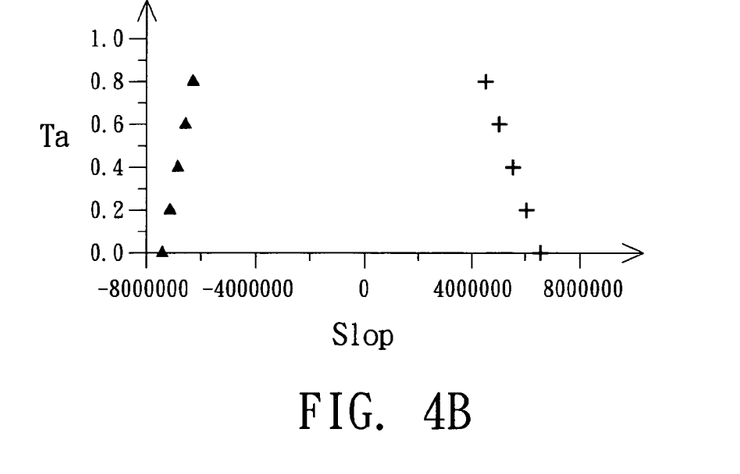
FIG. 4B is a diagram showing the relationship between the slope of the rising edges and the falling edges of the synchronous data signal of the radio frequency signal according to FIG. 4A and the tangential-direction tilts.

It is found through experiment that when the optical disc tilts along the tangential direction, the absolute value of the slope of the rising edge of the corresponding synchronous data signal is not equal to that of the falling edge of the corresponding synchronous data signal. To make this point more clearly, refer to FIG. 4B, a diagram showing the relationship between the slope of the rising edge and the slope of the falling edge of the synchronous data signal of the radio frequency signal according to FIG. 4A and the tangential-direction tilt. In FIG. 4B, the x-axis is the slope (Slop), the y-axis is the tangential-direction tilt (Ta), the cross symbol denotes the slope of each rising edge RE in FIG. 4A, and the triangle symbol denotes the slope of each falling edge FE in FIG. 4A. It can be seen from FIG. 4B that the absolute value of the slope of the rising edge RE of a specific tangential-direction tilt Ta is not equal to that of the falling edge FE corresponding to the same tangential-direction tilt Ta.

Figure 4C:
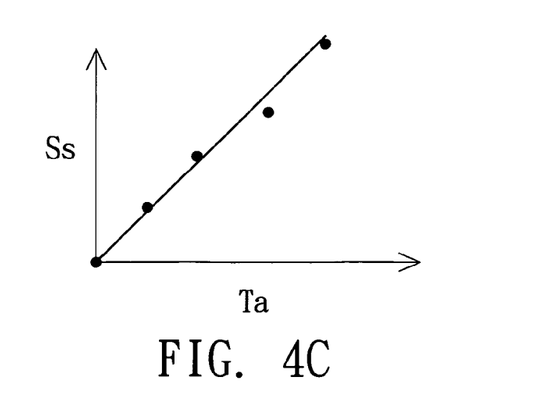
FIG. 4C is a diagram showing the relationship between the sums of the slope of the rising edges and the falling edges according to FIG. 4B and the tangential-direction tilts.

Besides, contrasting with the tangential-direction tilt 0°, calculate the corresponding slope sum of the slope of the rising edge RE and the slope of the falling edge FE for each tangential-direction tilt in FIG. 4B such that a relationship diagram like FIG. 4C can be obtained. In FIG. 4C, the x-axis is tangential-direction tilt (Ta), and the y-axis is slope sum (Ss). It is clear that in FIG. 4C, a function relationship exists between the tangential-direction tilt and the slope sum, wherein the function relationship can be marked as "the tangential tilt characteristic function", and when the tangential-direction tilt becomes larger, the corresponding slope sum would become larger as well. Therefore, the level of tilt that the optical disc declines along the tangential direction to the optical pick-up head can be obtained according to the sum of the slope of the rising edge and the slope of the falling edge of the synchronous data signal.

Figure 5:
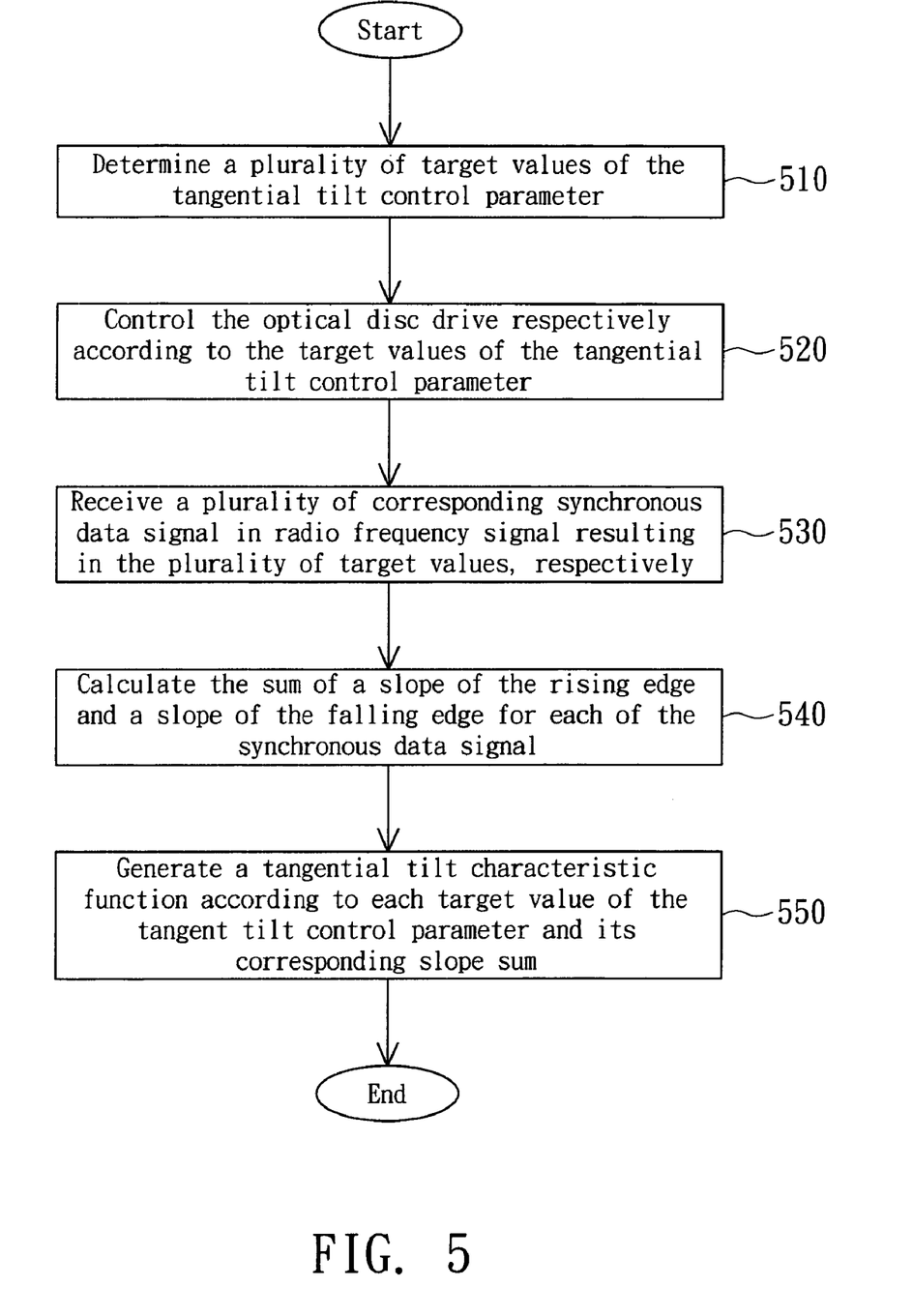
FIG. 5 is a flowchart of the method for generating the tangential tilt characteristic function.

FIG. 5 is a method flowchart for generating the tangential tilt characteristic function. At first, in step 510, calculate a plurality of target values of the tangential tilt control parameters corresponding to a plurality of tangential-direction tilts. Next, in step 520, control the optical disc drive respectively according to the target values of the tangential tilt control parameters such that the tilts between the optical axis of the optical pick-up head and the optical disc are respectively equal to the tangential-direction tilts. In step 530, receive a plurality of corresponding synchronous data signal in radio frequency signals outputted from the optical pick-up head, wherein each synchronous data signal results in one of the target values and comprises a rising edge and a falling edge. Next, in step 540, calculate a slope sum of the slope of the rising edge and the slope of the falling edge for each of the corresponding synchronous data. Then, in step 550, generate a tangential tilt characteristic function according to the target values of the tangential tilt control parameters and the corresponding slope sum. Furthermore, the tangential tilt characteristic function can be transferred into a tangential tilt characteristic table to simplify the calculation procedure during the operation of the optical disc drive.

Figure 6A:
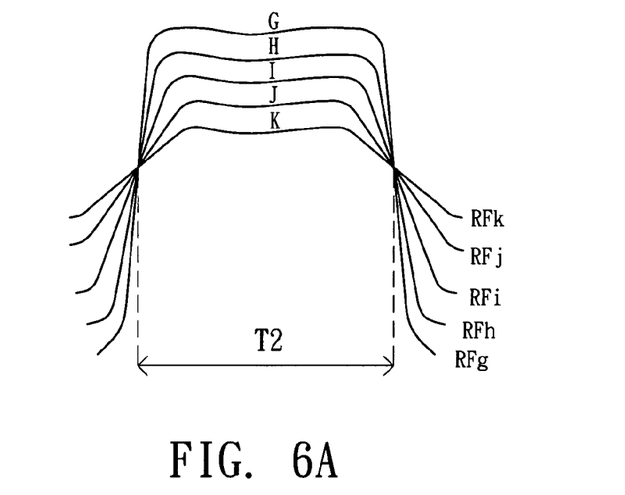
FIG. 6A is a diagram showing the corresponding radio frequency signals when the optical disc declines at different angles along the radial direction.

Next is the method for generating the first radial tilt characteristic function and the second radial tilt characteristic function is explained. Referring to FIG. 6A, a diagram showing the corresponding radio frequency signals when the optical disc declines at different angles along the radial direction is shown. Synchronous data signals G, H, I, J and K each having a nominal time width T2 within radio frequency signals RFg, RFh, RFi, RFj and RFk respectively correspond to the state of the optical disc having a tilt 0°, 0.2°, 0.4°, 0.6° and 0.8° along radial direction. When the optical disc declines along the tangential direction 0° and declines along the radial direction 0°, the optical axis of the optical pick-up head is perpendicular to the optical disc.

Figure 6B:
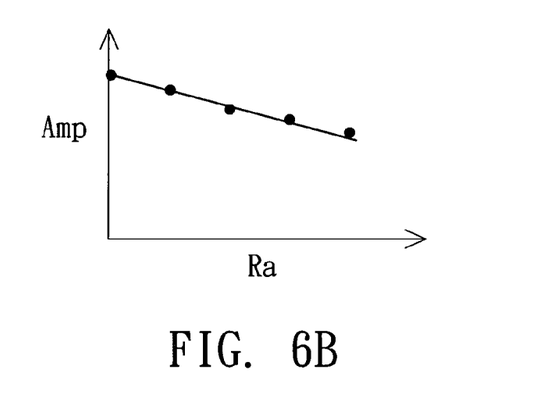
FIG. 6B is a diagram showing the relationship between the amplitudes of the synchronous data signal of the radio frequency signal according to FIG. 6A and the radial-direction tilts.

It is found through experiment that when the optical disc declines along a radial direction, a certain function relationship called the "first radial tilt characteristic function" exists between the amplitude of the corresponding synchronous data signal and the radial-direction tilt. To make this point more clear, refer to FIG. 6B, a diagram showing the relationship between the amplitude of the synchronous data signal of the radio frequency signal according to FIG. 6A and the radial-direction tilt. In FIG. 6B, the x-axis is the radial-direction tilt (Ra), and the y-axis is the amplitude (Amp) of the synchronous data signal. It is clear that in FIG. 6B, when the radial-direction tilt becomes larger, the amplitude of the corresponding synchronous data signal becomes smaller. Therefore, the level of tilt along the radial direction made by the optical disc in response to the optical pick-up head can be obtained according to the amplitude of the synchronous data signal.

Figure 6C:
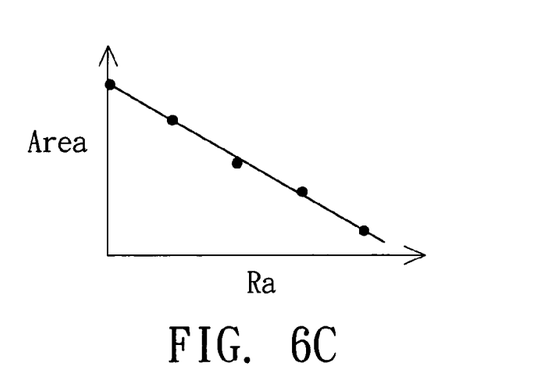
FIG. 6C is a diagram showing the relationship between the time domain areas of the synchronous data signal of the radio frequency signal according to FIG. 6A and the radial-direction tilts.

Moreover, when the optical disc declines along the radial direction, a certain function relationship called the "second radial tilt characteristic function" exists between the time domain area of the corresponding synchronous data signal and the radial-direction tilt. Referring to FIG. 6C, a diagram showing the relationship between the time domain area of the synchronous data signal of the radio frequency signal according to FIG. 6A and the radial-direction tilt is shown. For example, the time domain area of the synchronous data signal is obtained by integrating the function of the synchronous data signal over the time domain. In FIG. 6C, the x-axis is the radial-direction tilt (Ra), and the y-axis is the area (Area) obtained by integrating the function of the synchronous data signal over the time domain. It is clear that in FIG. 6C, when the radial-direction tilt becomes larger, the integration area of the corresponding synchronous data signal over the time domain becomes smaller. Therefore, the tilt along the radial direction made by the optical disc in response to the optical pick-up head can be obtained according to the integration area of the synchronous data signal.

That is to say, when the optical disc declines along the radial direction, a certain function relationship always exists between the amplitude of the corresponding synchronous data signal and the radial-direction tilt and a certain function relationship also exists between the time domain area of the corresponding synchronous data signal and the radial-direction tilt. Therefore, the level of tilt to the optical pick-up head along the radial direction can always be obtained according to either by referring to the amplitude of the synchronous data signal or the time domain area of the synchronous data signal.

Figure 7:
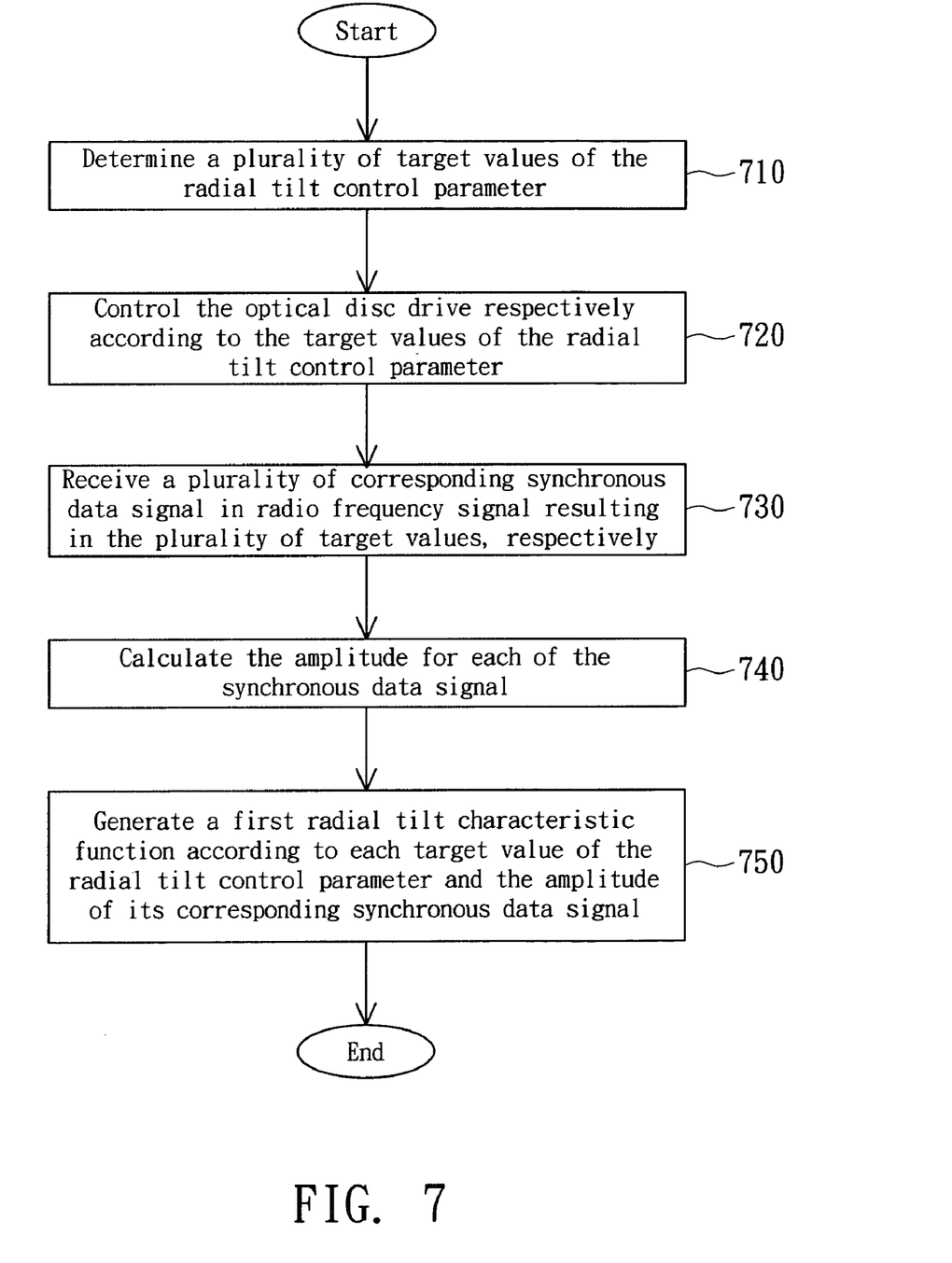
FIG. 7 is a flowchart of the method for generating the first radial tilt characteristic function.

FIG. 7 is a flowchart of the method for generating the first radial tilt characteristic function. At first, in step 710, determine a plurality of target values radial tilt control parameters corresponding to a plurality of radial-direction tilts. Next, in step 720, control the optical disc drive respectively according to the target values of radial tilt control parameters such that the tilts between the optical axis of the optical pick-up head and the optical disc are respectively equal to the radial-direction tilts. In step 730, receive a plurality of synchronous data signal in radio frequency signals outputted from the optical pick-up head, wherein each synchronous data signal results from one of the target values and comprises a rising edge and a falling edge. Next, in step 740, calculate the amplitude of each synchronous data signal. Then, in step 750, generate a first radial tilt characteristic function according to the target values of the radial tilt control parameters and the amplitudes of the corresponding synchronous data signals. Furthermore, the first radial tilt characteristic function can be transferred into a first radial tilt characteristic table to simplify the calculation procedure during the operation of the optical disc drive.

The second radial tilt characteristic function and the second radial tilt characteristic table denote the corresponding relationship between the time domain area of the synchronous data signals and the radial tilt control parameters. The method for generating the second radial tilt characteristic function and the second radial tilt characteristic table is similar to the above-mentioned method for generating the first radial tilt characteristic function and the first radial tilt characteristic table, and is not repeated here.

The tangential tilt characteristic function generated according to the above-mentioned method represents a corresponding relationship between the slope sums and the tangential tilt control parameters. Therefore, the tangential tilt control parameters can be obtained according to the slope sums. Besides, the first and the second radial tilt characteristic functions generated according to the above-mentioned method respectively represent a corresponding relationship between the amplitudes of the synchronous data signal and the radial tilt control parameters and a corresponding relationship between the time domain areas of the synchronous data signal and the radial tilt control parameters. Therefore, the radial tilt control parameters can be obtained according to the amplitudes of the synchronous data signal or the time domain areas of the synchronous data signal. The tangential tilt characteristic function, the first radial tilt characteristic function and the second radial tilt characteristic function, all of which are generated according to the above-mentioned method, are executed and recorded during the calibration of the optical disc drive before the products leave the factory. Besides, the functions can also be designed to be executed during the calibration of the optical disc drive by the user after the products leave the factory, or when the optical pick-up head has a poor quality in reading the signals, so that the optical axis of the optical pick-up head can remain perpendicular to the optical disc.

Figure 8:
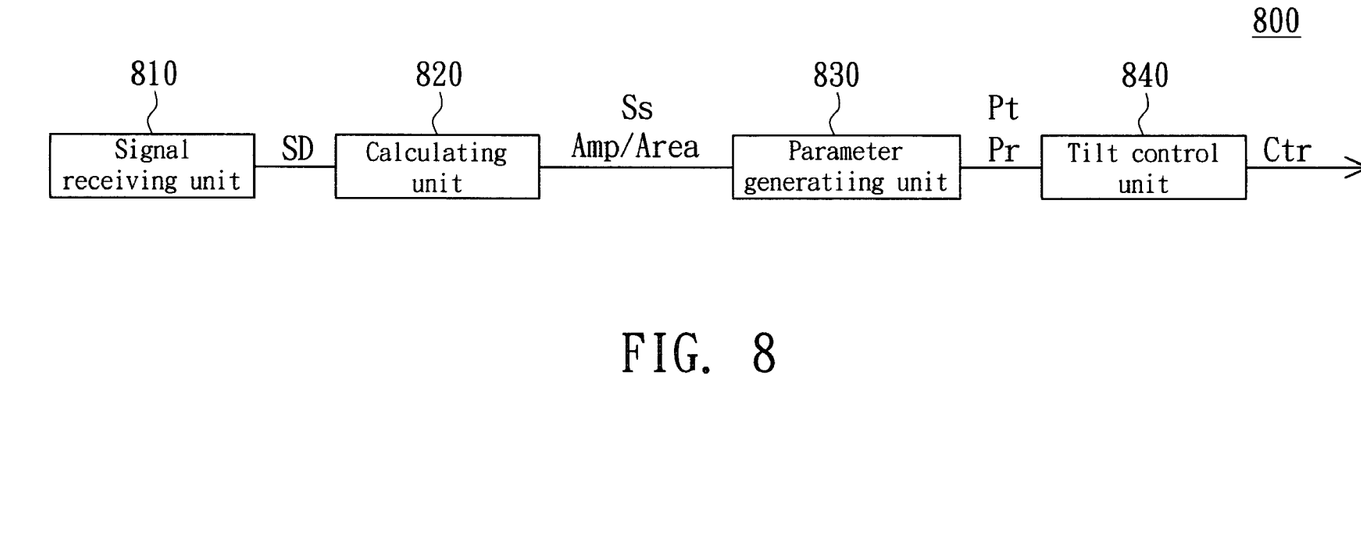
FIG. 8 is a block diagram of the apparatus for controlling the tilt between an optical axis of an optical pick-up head and the optical disc according to a preferred embodiment of the invention.

FIG. 8 is a block diagram of an apparatus for controlling the tilt between an optical axis of an optical pick-up head and the optical disc according to a preferred embodiment of the invention. The apparatus 800 for controlling the optical disc tilt includes a signal receiving unit 810, a calculating unit 820, a parameter generating unit 830, and a tilt control unit 840 for controlling the optical pick-up head 104 or other actuators relevant to the tilt adjustment. The signal receiving unit 810 is for receiving the synchronous data signal SD in the radio frequency signal, wherein the synchronous data signal SD comprises a rising edge and a falling edge. The calculation unit 820, according to the synchronous data signal SD, calculates the slope sum Ss, the amplitude Amp of the synchronous data signal SD or the integration area Area of the synchronous data signal SD over the time domain. The slope sum Ss is the sum of the slope of the rising edge and the slope of the falling edge of the synchronous data signal SD.

The parameter generating unit 830 determines the tangential tilt control parameter Pt according to the slope sum Ss with reference to the predetermined tangential tilt characteristic function, and determines the radial tilt control parameter Pr according to the amplitude Amp of synchronous data signal SD with reference to the first radial tilt characteristic function or according to the integration area of the synchronous data signal SD over the time domain with reference to the second radial tilt characteristic function. The tilt control unit 840 generates a set of control values Ctr to control the optical disc drive according to the tangential tilt control parameter Pt and the radial tilt control parameter Pr. For example, by controlling the optical pick-up head 104 or other actuators relevant to the adjustment of the tilt, the optical axis of the optical pick-up head maintains a preferable tilt in response to the optical disc. For example, let the optical axis of the optical pick-up head remain perpendicular in response to the optical disc. The signal receiving unit 810, the calculating unit 820, the parameter generating unit 830, and the tilt control unit 840 can be implemented through hard-wired circuit or a program executed by a microprocessor.

The method and apparatus for controlling the tilt between the optical axis of the optical pick-up head and the optical disc disclosed in above-mentioned embodiment enables the optical disc to remain perpendicular to the optical axis of the optical pick-up head during rotation and prevents the laser spots projected onto the optical disc from optical degradation such as spherical aberration, coma, astigmatism, field curvature, distortion, etc., thereby improving reading quality.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for controlling a tilt between an optical axis of an optical pick-up head and an optical disc, applied in an optical disc drive, the method comprising:

receiving a trapezoidal-wave signal in a radio frequency signal, wherein the trapezoidal-wave signal comprises a rising edge and a falling edge;

calculating a slope sum, wherein the slope sum is a sum of the slope of the rising edge and the slope of the falling edge;

generating a tangential tilt control parameter by inquiring a tangential tilt characteristic function according to the slope sum; and controlling the optical disc drive according to the tangential tilt control parameter;

wherein the tangential tilt characteristic function is generated by steps comprising:

determining a plurality of target values of target tangential tilt control parameters corresponding to a plurality of target tangential-direction tilts;

respectively controlling the optical disc drive according to the target values of the target tangential tilt controlling parameters, and receiving a plurality of corresponding target trapezoidal-wave signals outputted by the optical pick-up head, wherein each target trapezoidal-wave signal results from one of the target values and comprises a target rising edge and a target falling edge;

calculating a plurality of target slope sums, wherein each of the target slope sum is the sum of a slope of the target rising edge and a slope the target falling edge of the corresponding target trapezoidal-wave signal; and generating the tangential tilt characteristic function according to the target values of the target tangential tilt control parameters and the corresponding target slope sums.

2. The method according to claim 1, further comprising:

calculating an amplitude or a time domain area of the trapezoidal-wave signal;

generating a radial tilt control parameter according to the amplitude or time domain area of the trapezoidal-wave signal; and controlling the optical disc drive according to the radial tilt control parameter.

3. The method according to claim 2, wherein the time domain area of the trapezoidal-wave signal is calculated by integrating the trapezoidal-wave signal over the time domain.

4. The method according to claim 2, wherein in the step of generating the radial tilt control parameter, the radial tilt control parameter is generated by inquiring a first radial tilt characteristic function with the amplitude of the trapezoidal-wave signal or a second radial tilt characteristic function with time domain area of the trapezoidal-wave signal.

5. The method according to claim 4, wherein the first radial tilt characteristic function is generated by steps comprising:

determining a plurality of target values of radial tilt control parameters corresponding a plurality of radial-direction tilts;

respectively controlling the optical disc drive according to the target values of the radial tilt control parameters, and receiving a plurality of corresponding trapezoidal-wave signals outputted by the optical pick-up head;

calculating an amplitude for each trapezoidal-wave signal; and generating the first radial tilt characteristic function according to the target values of the radial tilt control parameters and the amplitudes of the corresponding trapezoidal-wave signals.

6. The method according to claim 4, wherein the second radial tilt characteristic function is generated by steps comprising:

determining a plurality target values of radial tilt control parameters corresponding a plurality of radial-direction tilts;

respectively controlling the optical disc drive according to the target values of the radial tilt control parameters, and receiving a plurality of corresponding trapezoidal-wave signals outputted by the optical pick-up head;

calculating a time domain area for each trapezoidal-wave signal; and generating the second radial-direction tilt characteristic function according to the target values of the radial tilt control parameters and the time domain areas of the corresponding trapezoidal-wave signals.

7. The method according to claim 1, wherein the trapezoidal-wave signal is a synchronous data signal complying with DVD specification.

8. A method for determining a set of tilt control parameters for controlling an optical axis of an optical pick-up head to an optical disc in an optical disc drive, the tilt control parameters comprising a tangential tilt control parameter, the method comprising:

receiving a first trapezoidal-wave signal in a radio frequency signal, wherein the first trapezoidal-wave signal comprises a rising edge and a falling edge;

calculating a slope sum, wherein the slope sum is a sum of the slope of the rising edge and the slope of the falling edge of the first trapezoidal-wave signal; and generating the tangential tilt control parameter by inquiring a tangential tilt characteristic function according to the slope sum;

wherein the tangential tilt characteristic function is generated by steps comprising:

determining a plurality of target values of target tangential tilt control parameters corresponding to a plurality of target tangential-direction tilts;

respectively controlling the optical disc drive according to the target values of the target tangential tilt controlling parameters, and receiving a plurality of corresponding target trapezoidal-wave signals outputted by the optical pick-up head, wherein each target trapezoidal-wave signal results from one of the target values and comprises a target rising edge and a target falling edge;

calculating a plurality of target slope sums, wherein each of the target slope sum is the sum of a slope of the target rising edge and a slope the target falling edge of the corresponding target trapezoidal-wave signal; and generating the tangential tilt characteristic function according to the target values of the target tangential tilt control parameters and the corresponding target slope sums.

9. The method according to claim 8, wherein the trapezoidal-wave signal is a synchronous data signal complying with DVD specification.

10. The method according to claim 8, wherein the set of tilt control parameters further comprises a radial tilt controlling parameter, the method comprises:

receiving a second trapezoidal-wave signal in the radio frequency signal;

calculating an amplitude or a time domain area of the second trapezoidal-wave signal; and generating the radial tilt control parameter according to the amplitude or time domain area of the second trapezoidal-wave signal.

11. The method according to claim 10, wherein in the step of generating the radial tilt control parameter, the radial tilt control parameter is generated by inquiring a radial tilt characteristic function, steps for generating the radial tilt characteristic function comprise:

determining a plurality of target values of radial tilt control parameters corresponding to a plurality of radial-direction tilts;

respectively controlling the optical disc drive according to the target values of the radial tilt control parameters, and receiving a plurality of corresponding trapezoidal-wave signals outputted by the optical pick-up head;

calculating an amplitude or a time domain area of each trapezoidal-wave signal result; and generating the radial tilt characteristic function according to the target values of the radial tilt control parameters and the amplitudes or the time domain areas of the corresponding trapezoidal-wave signals.

* * * * *